Sept. 10, 1935.  D. L. LOTTS  2,013,891
BRAKE MECHANISM
Filed March 14, 1931  2 Sheets-Sheet 1

Inventor
Delbert L. Lotts,
Wallace R. Lane, Atty.

Witness:
Chas. L. Hursh.

Sept. 10, 1935.                D. L. LOTTS                    2,013,891
                            BRAKE MECHANISM
                         Filed March 14, 1931      2 Sheets-Sheet 2
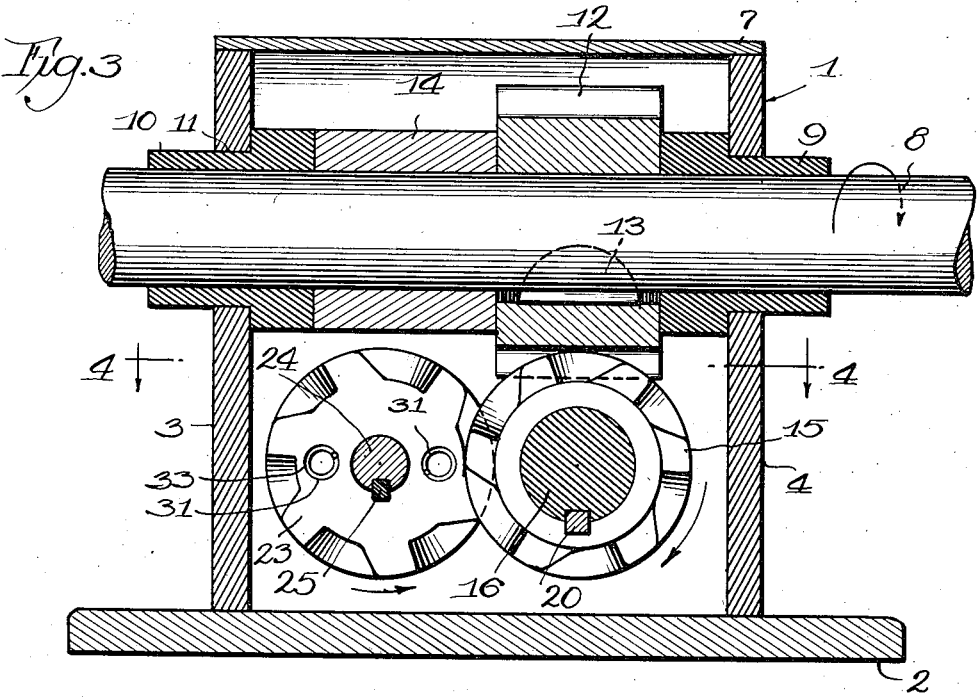
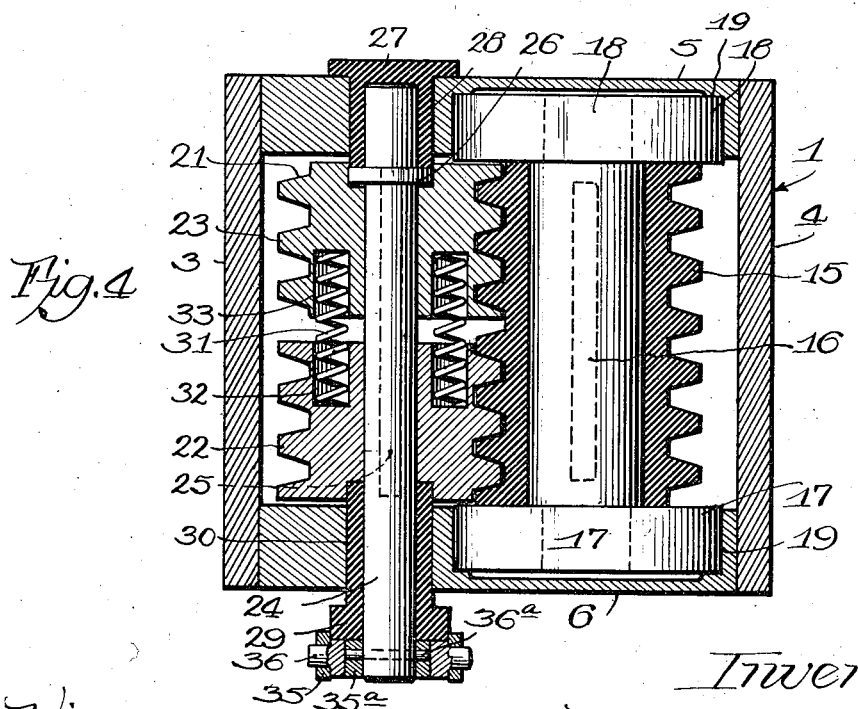
Inventor,
Delbert L. Lotts,
Wallace R. Lane Atty.
Witness:
Chas. R. Konish

Patented Sept. 10, 1935

2,013,891

UNITED STATES PATENT OFFICE 2,013,891

BRAKE MECHANISM

Delbert L. Lotts, Chicago, Ill., assignor to General Research Corporation, Chicago, Ill., a corporation Application March 14, 1931, Serial No. 522,554

9 Claims. (Cl. 188—71)

The present invention relates to brake mechanisms.

Among the objects of the present invention is to provide a brake mechanism adapted to apply a retarding force to moving mechanism for bringing such mechanism to rest or for decreasing the speed thereof.

Another object of the present invention is to provide a novel brake mechanism adapted to be easily assembled and placed in operative association with a power element or the like, whereby the speed of said power element or the like may be reduced or brought to rest by application of said mechanism.

The present invention contemplates the idea of providing a brake mechanism adapted to be adequately housed or enclosed and therefore not subject to the wearing effects of dirt, dust, and other foreign substances frequently accumulating in the present known brake devices, and causing either excess wear thereon or irreparable damage thereto.

In the present invention, the brake mechanism is normally enclosed in a housing, casing or the like and is adapted to run or operate submerged in oil, grease or the like and is accordingly substantially free from the effects of atmospheric conditions and expansion due to changes in temperature. In the present invention, the braking surfaces of the mechanism, which are positive in action and respond readily when operated in a braking position, are or may be enclosed or immersed in a lubricant, a condition unheard of heretofore and radically different than the ordinary well known drum type of brake, as at present used where a braking action is desired. The ordinary brake lining so well known is entirely eliminated in the present brake mechanism and forms no part thereof. Repairs and replacements of such an element are therefore avoided.

Further, it is to be observed in the present invention that the efficiency of the device is in no wise lessened or decreased because of the lubricated braking surfaces.

A further object of the present invention is to provide a brake mechanism adapted to be maintained in a braking position over an extended period of time without the parts or elements thereof becoming heated and/or damaged. The advantages of this particular feature of the present invention recommends the present braking mechanism for use in automotive vehicles and the like where the heating effects of the present known braking devices are very objectionable, causing damage to the parts and resulting in many otherwise avoidable accidents.

The present invention further comprehends the idea of providing a braking mechanism requiring no adjustment and wherein wear is a negligible factor. In the present braking mechanism, once the braking surfaces are set or moved into any given position for applying a given braking load to a movable element, the same braking load is maintained constant during the time interval that these surfaces are in this position. The braking load is further evenly and effectively distributed constantly throughout this interval of time.

A still further object of the invention is to provide a brake mechanism which, although auxiliary to the mechanism or element to be retarded, is substantially an integral unit and forms a part thereof. When the present brake mechanism is used in conjunction with a rotating shaft or the like, the same may be made integral with the casing or housing for the shaft or the like, if such a housing is provided, thus resulting in a compact structure.

The present invention comprehends the idea of providing a novel mechanism particularly adapted for applying a braking action to movable mechanisms for retarding or bringing the same to rest, yet further adapted to serve as a transmission mechanism between power elements.

Other objects, features, capabilities and advantages are comprehended by the invention as will later appear, and as are inherently possessed thereby.

Referring to the drawings:

Fig. 3 is a vertical cross sectional view taken in a plane represented by line 3—3 of Fig. 2 of the drawings and transverse of the cross sectional view of Fig. 2 of the drawings.

Fig. 4 is a horizontal cross sectional view taken in a plane represented by line 4—4 of Fig. 3 of the drawings.

Figure 1:
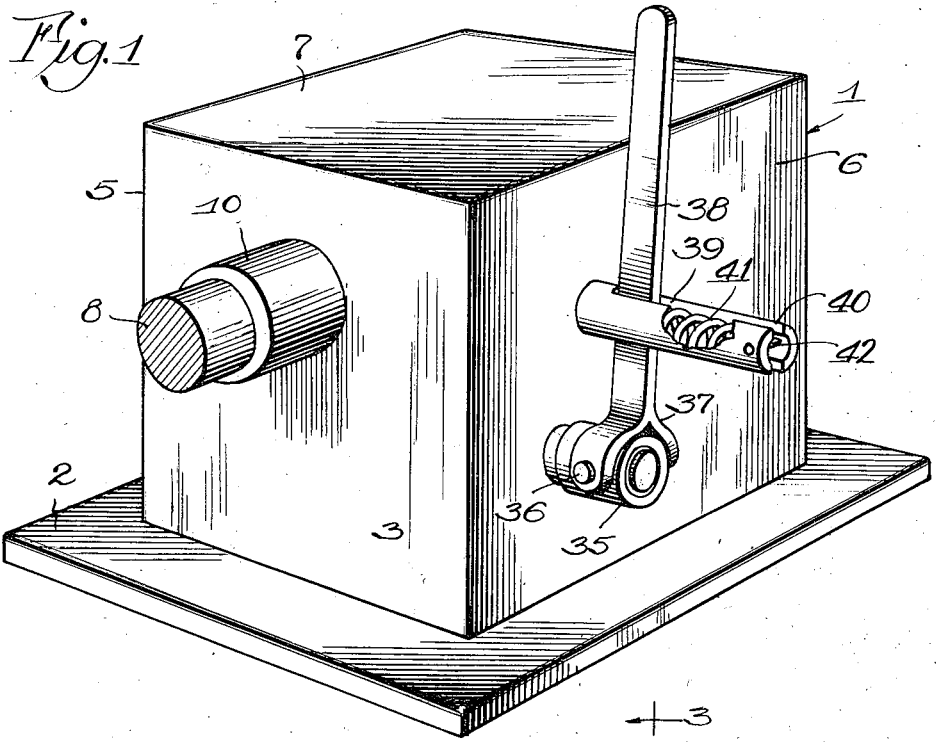
Fig. 1 is a view in perspective of an embodiment of the present invention.
Figure 2:
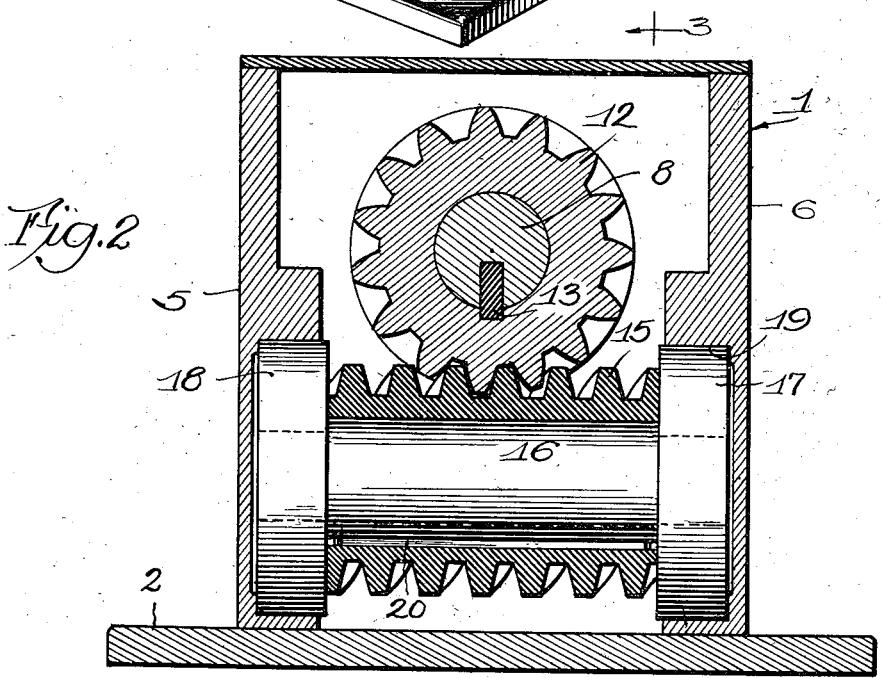
Fig. 2 is a vertical cross sectional view through Fig. 1 taken in a plane transverse of the axis of the element to be retarded.

Referring now more in detail to the drawings, an embodiment of the present novel braking mechanism is disclosed as being housed or enclosed within a casing or housing 1 having a support 2. This housing or casing 1 comprises the end walls 3 and 4, and the side walls 5 and 6. A top plate 7 which may be secured by any suitable means is provided for completely enclosing the mechanism to be hereinafter described. This casing may be either formed integral or the sides and ends thereof may be separate pieces welded or otherwise secured together to form the box-like casing 1. The bottom support plate 2 may be secured in any desired manner to the casing 1, and extends beyond the sides of the casing 1 to provide suitable means whereby this casing or housing may be mounted in any desired position.

In the present embodiment selected to illustrate the invention, the brake mechanism enclosed within the housing structure 1 is shown as being in association with a shaft 8 normally operated by a suitable source of power (not shown). This shaft 8 is adapted to rotate in the T-shaped bushings 9 and 10 mounted in suitable openings 11 in the end plates 3 and 4 of the housing 1. A worm gear 12 is mounted within the casing 1 and upon the shaft 8 and keyed thereto by means of the key 13, the same being held in position against the bushing 9 by means of a sleeve 14 mounted upon the shaft 8.

The worm gear 12 meshes with and is adapted to cause rotation of a worm 15 mounted upon a shaft 16 journalled in the end thrust bearing members 17 and 18 suitably mounted and positioned in the recesses or depressed portions 19 of the end walls 5 and 6. The worm 15 is keyed to the shaft 16 by means of the key 20, and is adapted to contact with either of the end thrust bearings 17 or 18. This worm 15 in turn meshes with and causes rotation of another worm 21 comprising worm sections 22 and 23 mounted upon a shaft 24 and keyed thereto by means of the key 25. One end of the shaft 24 is provided with a shoulder or abutment 26 adapted to receive the section 23 of the worm 21, and is adapted to abut the end of a bushing 27 secured in an opening 28 of the side wall or plate 5 of the housing 1, this end of the shaft 24 being adapted to be journalled in this bushing 27. The other end of the shaft 24 is journalled in the bushing 29 slidably mounted in an opening 30 in the side wall or plate 6 of the casing 1. This bushing 29 fits within or is adapted to be received by the section 22 of the worm 21.

The sections 22 and 23 of the worm 21 are slidable on the shaft 24 and are normally held in spaced relation by means of one or more coiled springs 31 seating in bores 32 and 33 of these sections, respectively. These springs tend to hold these sections 22 and 23 in their normal meshing position with the worm 15.

The section 22 of the worm 21 is moved longitudinally of the worm 15 and against the compression of the coiled springs 31 bearing against the section 23 by means of a sleeve 35 mounted on a collar 35$^a$ secured to the end of the shaft 24 by means of a pin 36$^a$ adapted to abut or bear against the bushing 29 for limiting its outward movement. This sleeve 35 is provided with oppositely disposed pins or projections 36 pivoted in the bifurcated end portions 37 of a lever arm 38 slidable within the slot 39 of a hollow tubular member 40 secured to the side wall or plate 6 of the casing 1. A coiled spring 41 having an end secured to a pin 42 is mounted within the tubular member 40 and is adapted to bear against the lever arm 38 for normally holding the same in the position as shown in Fig. 1 of the drawings. When the lever arm 38 is in this position, the coiled springs 31 tend to separate the sections 22 and 23 of the worm 21 whereby the same are in their normal meshing position with the worm 15.

If the lever arm 38 is moved outwardly and away from the side wall or plate 6 and against the action of the coiled spring 41, the sleeve 35 is moved inwardly and bears against the bushing 29 for movement of the section 22 toward the section 23 of the worm 21 for the purpose to be hereinafter more fully described.

As will be clearly seen, the present novel brake mechanism essentially comprises the worms 15 and 21 and for the purposes of disclosure have been shown as being mounted in a housing enclosing the same, as likewise a worm gear mounted upon a rotating element, such as the shaft 8. Although this shaft 8 might form a part of any mechanism, for the purposes of the present discussion, it is assumed that the same is a shaft driven by the prime mover of an automotive vehicle and has a driving wheel mounted on the outer end thereof. This shaft 8, then, would comprise the means whereby these wheels were driven by the prime mover of the vehicle. The present novel brake mechanism comprising the worms 15 and 21 is shown as being in mesh with the gear 12 mounted upon this driving shaft 8.

For the purposes of illustration, let us assume that the shaft 8 is being driven from the prime mover for driving the vehicle forwardly through the rear wheels, and that it is desired to apply a braking force to this shaft in order to slow down the same and the vehicle. This braking force may be effected by means of the lever 38. When the same is moved outwardly away from the side plates or wall 6, the bushing 29 is moved thereby, and the section 22 of the worm 21 is moved longitudinally of the worm 15. Upon movement of this section 22, the coiled springs 31 are compressed and a force is likewise applied to the section 23 tending to move the same toward the side wall or plate 5.

Longitudinal movement of the worm 21 relative to the worm 15 causes a force or forces to be applied through the teeth of the sections 22 and 23 through the teeth of the worm 15 thereby causing an end thrust to be applied through the worm 15 to the end thrust bearing 18, assuming that the shaft 8 is being rotated as indicated by the arrow in Fig. 3 of the drawings. This end thrust causes a decrease in the speed of rotation of the worm 15, which, previous to the movement of the lever 38 had been freely rotating in mesh with the worm gear 12. A decrease in the speed of rotation of the worm 15 causes a similar decrease in the speed of rotation of the shaft 8, and if desired, sufficient application of pressure or force to the teeth of the worm 15 by means of the teeth of the worm 21, will cause the shaft 8 to come to rest.

It will be readily seen that a very small amount of pressure or force is required between the teeth of the worms 21 and 15 for decreasing the speed of the shaft 8 for causing the same to come to rest. It has been found in practice that when the teeth of the helical gear 12 are cut on an angle of 23° and intermesh with a worm 15 having its teeth cut on an angle of 67°, the results are very satisfactory. With these gears cut as indicated, approximately sixty seven pounds out of every ninety pounds of torque applied to the shaft 8 is consumed in the end thrust of the worm 15 against its bearings, and only approximately twenty-three pounds is utilized in causing the rotation of this worm. It has been found, however, that if ball bearings are used for receiving the end thrust of the worm 15, the helical angle of the worm gear 12 may be anywhere between 17 and 23 degrees and produce very satisfactory results.

In practice, any suitable link or other mechanism may be provided and connected to the lever 38 whereby this brake mechanism may be operated by the operator of the vehicle from the operator's seat.

It will be apparent from the above disclosure that when the sections 22 and 23 of the worm 21 are in normal meshing relation with the worm 15, the worm 15 is free to normally rotate in meshing relation with the gear 12 of the element 8. A small amount of clearance between the teeth of the worms is provided so that there is none or substantially no friction of one upon the other. If, however, the bushing 29 is moved inwardly as indicated for movement of sections 22 and 23, the teeth of worm 21 frictionally engage the teeth of worm 15 for retarding rotation thereof, as above described, for effecting a braking action on the shaft 8.

It is of course understood that the braking force may be applied to the worm 15 through the medium of the worm 21 irrespective of the direction in which the shaft 8 is operated. It will also be quite apparent that an integral worm construction for applying a force to the worm 15, or if desired, any other suitable frictional means may be used for retarding movement of the worm 15 and shaft 8, without departing from the spirit of the invention.

While I have herein described and upon the drawings shown an illustrative embodiment of the invention, it is to be understood that the invention is not limited thereto, but may comprehend other constructions, arrangements of parts, details and features without departing from the spirit of the invention.

Having thus disclosed the invention, I claim:

1. A brake mechanism comprising a gear, an auxiliary braking unit meshing with said gear and including intermeshing gears, one of said last mentioned gears being movable relative to the other for applying a pressure thereto for retarding movement thereof and said first mentioned gear in the direction of their normal movement.

2. A brake mechanism comprising a worm and gear, and a second worm normally meshing with said first worm and rotated thereby, and means for moving said second worm relative to said first worm whereby movement of said gear in its normal direction is retarded.

3. A brake mechanism comprising a worm and gear, and a slidably mounted worm meshing with said first worm, and means for sliding said second worm longitudinally of said first worm for applying an end thrust thereto whereby movement of said worm and gear is retarded.

4. A brake mechanism comprising a gear, intermeshing auxiliary worms, one of said worms meshing with said gear, and means for moving one of said worms longitudinally of the other for retarding rotation thereof and said gear.

5. A brake mechanism comprising rotatable means, and an auxiliary device driven by said means, said device comprising intermeshing worms, one of said worms being slidably mounted, and means for moving said slidably mounted worm longitudinally of the other for applying an end thrust thereto for retarding rotation thereof and rotation of said means.

6. A brake mechanism comprising a worm gear mounted on a shaft to be retarded, and a braking device meshing with and driven by said gear and including intermeshing worms adapted to retard movement of said gear and shaft in the direction of movement.

7. A brake mechanism comprising a gear mounted upon a shaft to be retarded, a braking device meshing with said gear and including intermeshing worms, one of said worms comprising worm sections meshing with the other of said worms, means for normally holding said sections in spaced relation, and means for moving said sections longitudinally of said other worm for applying a thrust thereto for retarding movement of said gear and shaft.

8. A brake mechanism for retarding movement of a shaft in its normal direction of movement, comprising a braking device, intermeshing gears on said shaft and in said device, a second gear in said device in meshing engagement with the first mentioned gear thereof, and means for shifting the position of said second gear for retarding rotation of said gears and shaft.

9. A brake mechanism comprising a gear mounted on a shaft to be retarded, and a braking device for retarding movement of the shaft and its gear in their normal direction, said device including intermeshing gears, one of which is in meshing engagement with the gear on said shaft.

DELBERT L. LOTTS.

CERTIFICATE OF CORRECTION.

Patent No. 2,013,891. September 10, 1935.

DELBERT L. LOTTS.

It is hereby certified that error appears in the printed specification of the above numbered patent requiring correction as follows: Page 3, second column, line 25, claim 6, after "of " insert the words their normal; and that the said Letters Patent should be read with this correction therein that the same may conform to the record of the case in the Patent Office.

Signed and sealed this 8th day of October, A. D. 1935.

Leslie Frazer (Seal) Acting Commissioner of Patents.